United States Patent
Sato et al.

(10) Patent No.: US 11,285,913 B2
(45) Date of Patent: Mar. 29, 2022

(54) ELECTRIC STEERING LOCK DEVICE FOR SADDLE-RIDE TYPE VEHICLE

(71) Applicant: KABUSHIKI KAISHA HONDA LOCK, Miyazaki (JP)

(72) Inventors: Yuuichi Sato, Miyazaki (JP); Akiko Nakatake, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 351 days.

(21) Appl. No.: 16/478,150

(22) PCT Filed: Sep. 28, 2017

(86) PCT No.: PCT/JP2017/035098
§ 371 (c)(1),
(2) Date: Jul. 16, 2019

(87) PCT Pub. No.: WO2018/158997
PCT Pub. Date: Sep. 7, 2018

(65) Prior Publication Data
US 2019/0366976 A1    Dec. 5, 2019

(30) Foreign Application Priority Data
Mar. 2, 2017 (JP) .............................. JP2017-039539

(51) Int. Cl.
*B60R 25/0215* (2013.01)
*E05B 81/06* (2014.01)
(Continued)

(52) U.S. Cl.
CPC .......... *B60R 25/0215* (2013.01); *E05B 81/06* (2013.01); *B62K 21/14* (2013.01);
(Continued)

(58) Field of Classification Search
CPC .......... B60R 25/02153; B60R 25/0215; B60R 25/02; B60R 25/0211; E05B 81/06;
(Continued)

(56) References Cited

U.S. PATENT DOCUMENTS 6,354,118 B1   3/2002   Frick et al.
6,776,016 B1   8/2004   Wittwer et al.
(Continued)

FOREIGN PATENT DOCUMENTS

CN   2244500 Y   1/1997
CN   1370120 A   9/2002
(Continued)

OTHER PUBLICATIONS

Chinese Office Action (CNOA) dated Jan. 5, 2021 for the corresponding Chinese Patent Application No. 201780083302.1 and its English translation.
(Continued)

*Primary Examiner* — Christine M Mills
*Assistant Examiner* — Christopher F Callahan
(74) *Attorney, Agent, or Firm* — Rankin, Hill & Clark LLP

(57) ABSTRACT

In an electric steering lock device for saddle-ride type vehicle, a casing movably supports a lock pin and a slider. The lock pin is linearly movable between a lock position and an unlock position. The slider is movable in a direction identical to a movement direction of the lock pin. The casing houses an elastic member that is interposed between the lock pin and the slider, and an electric motor that provides a power that drives the slider. The electric steering lock device for saddle-ride type vehicle avoids being large-sized and reliably detects a position of the lock pin. A casing 18 movably supports a first interlocking member 72 and a second interlocking member 73. The first interlocking mem-
(Continued)

ber 72 moves in a direction identical to a lock pin 19 by interlocking with the lock pin 19. The second interlocking member 73 moves in a direction orthogonal to the movement direction of the lock pin 19 and the first interlocking member 72 by interlocking with the first interlocking member 72. A switch 74 that detects a position of the second interlocking member 73 is mounted on the casing 18.

5 Claims, 11 Drawing Sheets

(51) Int. Cl.
  *B62K 21/14* (2006.01)
  *E05B 81/40* (2014.01)
  *E05B 81/66* (2014.01)
  *E05B 83/00* (2014.01)

(52) U.S. Cl.
  CPC ............ *E05B 81/40* (2013.01); *E05B 81/66* (2013.01); *E05B 83/00* (2013.01)

(58) Field of Classification Search
  CPC .......... E05B 81/40; E05B 81/64; E05B 81/66; E05B 83/00; Y10T 292/096; Y10T 292/1021; Y10T 292/1018; Y10T 292/307; Y10T 70/5646; Y10T 70/565; Y10T 70/5655; Y10T 70/5659; Y10T 70/5664; Y10T 70/5681; Y10T 70/5686; Y10T 70/5956; Y10T 70/5973; Y10T 70/5978; Y10T 70/5925; Y10T 70/5929; Y10T 70/5934; Y10T 70/7051; Y10T 70/7062; Y10T 70/7068; Y10T 70/7113; B62K 21/14
  See application file for complete search history.

(56) References Cited

U.S. PATENT DOCUMENTS

| | | | |
|---|---|---|---|
| 2008/0047309 A1 | 2/2008 | Okuno et al. | |
| 2008/0236216 A1 | 10/2008 | Takeuchi et al. | |
| 2009/0139285 A1* | 6/2009 | Tanioka | B60R 25/02153 70/209 |
| 2010/0083716 A1 | 4/2010 | Fukatsu et al. | |
| 2010/0206020 A1* | 8/2010 | Chen | B60R 25/02153 70/210 |
| 2010/0236304 A1 | 9/2010 | Yuhi | |
| 2013/0257063 A1 | 10/2013 | Ishitsuka | |
| 2017/0113651 A1* | 4/2017 | Suzuki | B60R 25/021 |

FOREIGN PATENT DOCUMENTS

| | | | | |
|---|---|---|---|---|
| CN | 1572607 | A | 2/2005 | |
| CN | 101130358 | A | 2/2008 | |
| CN | 101219656 | A | 7/2008 | |
| CN | 101311056 | A | 11/2008 | |
| CN | 102126481 | A | 7/2011 | |
| CN | 203142616 | U | 8/2013 | |
| CN | 103538557 | A | 1/2014 | |
| EP | 3117059 | A1 | 1/2017 | |
| JP | 2000233716 | A | 8/2000 | |
| JP | 2002295090 | A | 10/2002 | |
| JP | 2007247153 | A | 9/2007 | |
| JP | 2010-89532 | A | 4/2010 | |
| JP | 2010215112 | A | 9/2010 | |
| JP | 5394361 | B2 | 1/2014 | |
| KR | 100820458 | B1 | 4/2008 | |
| WO | WO-02085678 | A1 * | 10/2002 | ....... B60R 25/02126 |
| WO | WO-2008056728 | A1 * | 5/2008 | ............ B60R 21/05 |

OTHER PUBLICATIONS

International Search Report dated Jan. 9, 2018 filed in PCT/JP2017/035098.

* cited by examiner

ELECTRIC STEERING LOCK DEVICE FOR SADDLE-RIDE TYPE VEHICLE

TECHNICAL FIELD

This application claims a priority based on "Japanese Patent Application No. 2017-039539" as Japan patent application filed on Mar. 2, 2017, the contents of which are incorporated by reference.

The present invention relates to an electric steering lock device for saddle-ride type vehicle where a lock pin, an elastic member, and an electric motor are housed in a casing secured to a vehicle body frame. The lock pin is linearly movable between a lock position at which the lock pin engages with a steering interlocking member that turns in accordance with a steering operation and an unlock position at which the engagement with the steering interlocking member is released. The elastic member movably supports the lock pin and a slider movable in a direction identical to a movement direction of the lock pin. The elastic member is interposed between the lock pin and the slider. The electric motor provides a power that drives the slider.

BACKGROUND ART

A slider where a coiled spring is interposed between a lock pin and the slider moves in an advancing/retreating direction of the lock pin by an electric motor. This moves the lock pin between a lock position and an unlock position. PATENT LITERATURE 1 discloses an electric steering lock device that determines the lock position and the unlock position of the lock pin by detecting a position of the slider to reflect the lock position and the unlock position in an operation control of the electric motor.

CITATION LIST

Patent Literature

PATENT LITERATURE 1: Japanese Patent No. 5394361

SUMMARY OF THE INVENTION

Problems to be Solved by the Invention

The configuration disclosed in the above-described PATENT LITERATURE 1 has a structure where the lock pin moves to the lock position only at a position at which the lock pin fits to a locking recess provided on a steering shaft as a steering interlocking member that turns by interlocking with a steering operation. Thus, in a state where the locking recess is located at the position displaced from the lock pin, even when the slider moves so as to move the lock pin to the lock position, the lock pin merely remains at a position abutting on an outer periphery of the steering shaft, and does not move to the lock position. When the steering shaft is turned to match the locking recess with the lock pin, the lock pin fits to the locking recess and moves to the lock position due to a spring force of the coiled spring.

Incidentally, in the case of a four-wheeled vehicle, locking recesses are provided at a plurality of positions in a circumferential direction of a steering shaft. In view of this, performing a slight turning operation on the steering shaft enables the locking recess to match the lock pin. However, a saddle-ride type vehicle, such as a motorcycle, has two turning positions of a steering interlocking member that can move the lock pin to the lock position because a steering lock state is provided by a steering handle maximally steered to each of right and left. In view of this, when the structure disclosed in the above-described PATENT LITERATURE 1 is directly applied to a saddle-ride type vehicle, a user incompletely turns the steering handle and possibly assumes that the steering handle is locked. This is not preferred in terms of preventing a theft.

Such a problem is solved by detecting a position of the lock pin itself to reliably recognize the lock state. However, the lock pin is located at a proximity of the steering shaft, and thus it is difficult to ensure an arrangement space of a switch that detects the position of the lock pin itself. Furthermore, even when the arrangement space is ensured, the device itself increases in size.

The present invention has been made in consideration of such circumstances, and its objective is to provide an electric steering lock device for saddle-ride type vehicle configured to reliably detect a position of the lock pin while avoiding increase in size.

Solution to the Problems

In order to achieve the above-described object, the first aspect of the present invention is an electric steering lock device for saddle-ride type vehicle including: a casing secured to a vehicle body frame; a steering interlocking member that turns in accordance with a steering operation; a lock pin linearly movable between a lock position and an unlock position, the lock pin engaging with the steering interlocking member at the lock position, and the lock pin releasing the engagement with the steering interlocking member at the unlock position; a slider movable in a direction identical to a movement direction of the lock pin; an elastic member that movably supports the lock pin and the slider and is interposed between the lock pin and the slider; an electric motor that provides a power that drives the slider; a first interlocking member; a second interlocking member; and a switch. The casing houses the lock pin, the slider, the elastic member, and the electric motor, the first interlocking member moves in the direction identical to the movement direction of the lock pin by interlocking with the lock pin, the second interlocking member moves in a direction orthogonal to the movement direction of the lock pin and the first interlocking member by interlocking with the first interlocking member, the first interlocking member and the second interlocking member are movably supported to the casing, and the switch detects a position of the second interlocking member and is mounted to the casing.

Further, in addition to the first aspect, the second aspect of the present invention is the electric steering lock device for saddle-ride type vehicle in which the casing at least includes a body and a cover member, the body movably supports the lock pin and the slider, houses the elastic member and the electric motor, and is mounted to the vehicle body frame, and the cover member is mounted to the body and covers a part of the body. The cover member supports the first and second interlocking members.

Effects of the Invention

With the first feature of the present invention, a switch detects positions of a first interlocking member that moves in an identical direction by interlocking with a lock pin and a second interlocking member that moves in a direction orthogonal to the movement direction of this first member by interlocking with this first interlocking member. This enables a position of the lock pin to be reliably detected at a position away from the lock pin, and furthermore eliminates the need for ensuring an extra space at a proximity of the lock pin to avoid increase in size.

Further, with the second feature of the present invention, a cover member that supports the first and second interlocking members is mounted to a body. This enables installation of the first and second interlocking members to the cover member before mounted to the body, and enables installation of the cover member to which the first and second interlocking members are installed to the body. Consequently, the facilitated installation operation is ensured.

DESCRIPTION OF THE EMBODIMENTS

Figure 1:
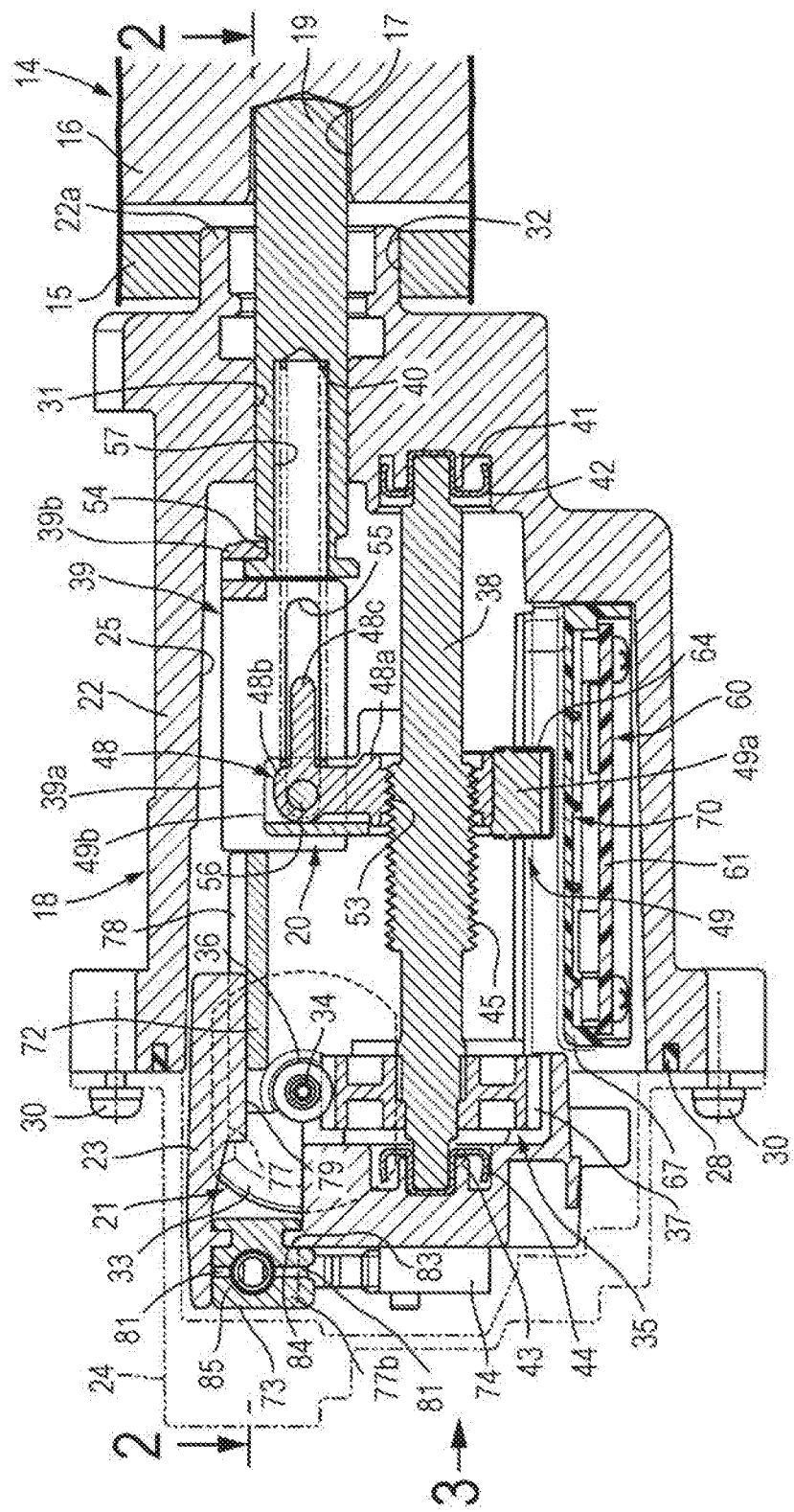
FIG. 1 is a vertical cross-sectional view in a state where an outer cover of an electric steering lock device is omitted in a state where a lock pin is located at a lock position, and is a cross-sectional view taken along a line 1-1 in FIG. 3.

An embodiment of the present invention will be described by referring to accompanying FIG. 1 to FIG. 11. First, in FIG. 1, a top bridge 16 of a front fork 14 continuous with a steering handle is turnably supported to a front portion of a vehicle body frame 15 of a motorcycle as a saddle-ride type vehicle. A casing 18 of an electric steering lock device is secured to the vehicle body frame 15. The electric steering lock device is configured to switch a lock state that engages with the top bridge 16 as a steering interlocking member that turns corresponding to an steering operation and an unlock state that releases the engagement with the top bridge 16. The top bridge 16 has two positions where locking recesses 17 are provided. The electric steering lock device includes a lock pin 19 configured to fit to the locking recesses 17 in a state where the steering handle is maximally steered each of right and left.

Figure 2:
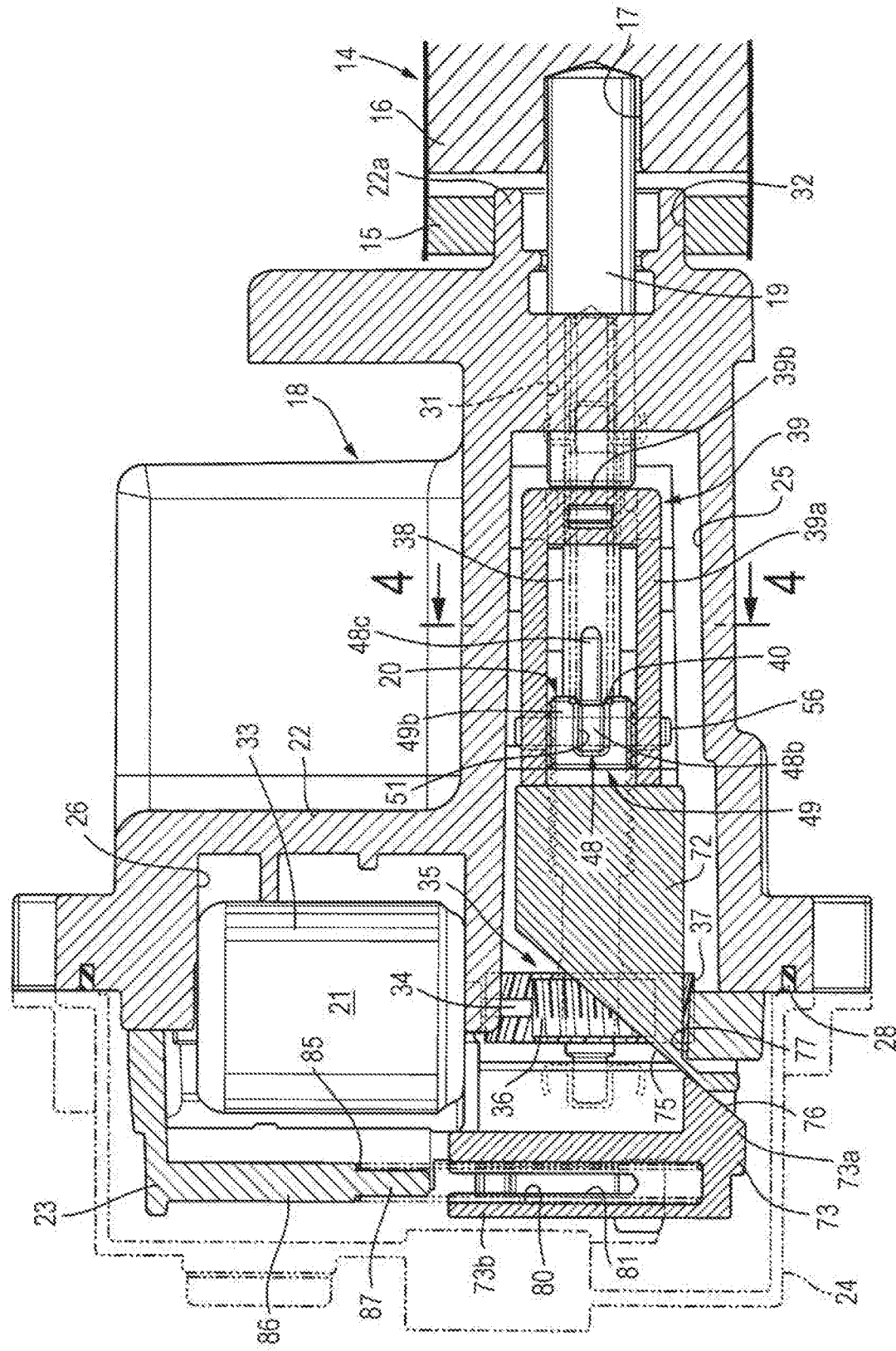
FIG. 2 is a cross-sectional view taken along a line 2-2 in FIG. 1.

Also with reference to FIG. 2, the electric steering lock device includes the casing 18, the lock pin 19, a slider 20, and an electric motor 21. The lock pin 19 is linearly movable between a lock position at which the lock pin 19 fits to the locking recess 17 to engage with the top bridge 16 and an unlock position at which the lock pin 19 is removed from the locking recess 17 to release the engagement with the top bridge 16. The slider 20 is movable in a direction identical to a movement direction of the lock pin 19. The electric motor 21 provides a power that drives the slider 20. The lock pin 19 and the slider 20 are movably supported to the casing 18. The electric motor 21 is housed in the casing 18.

Figure 3:
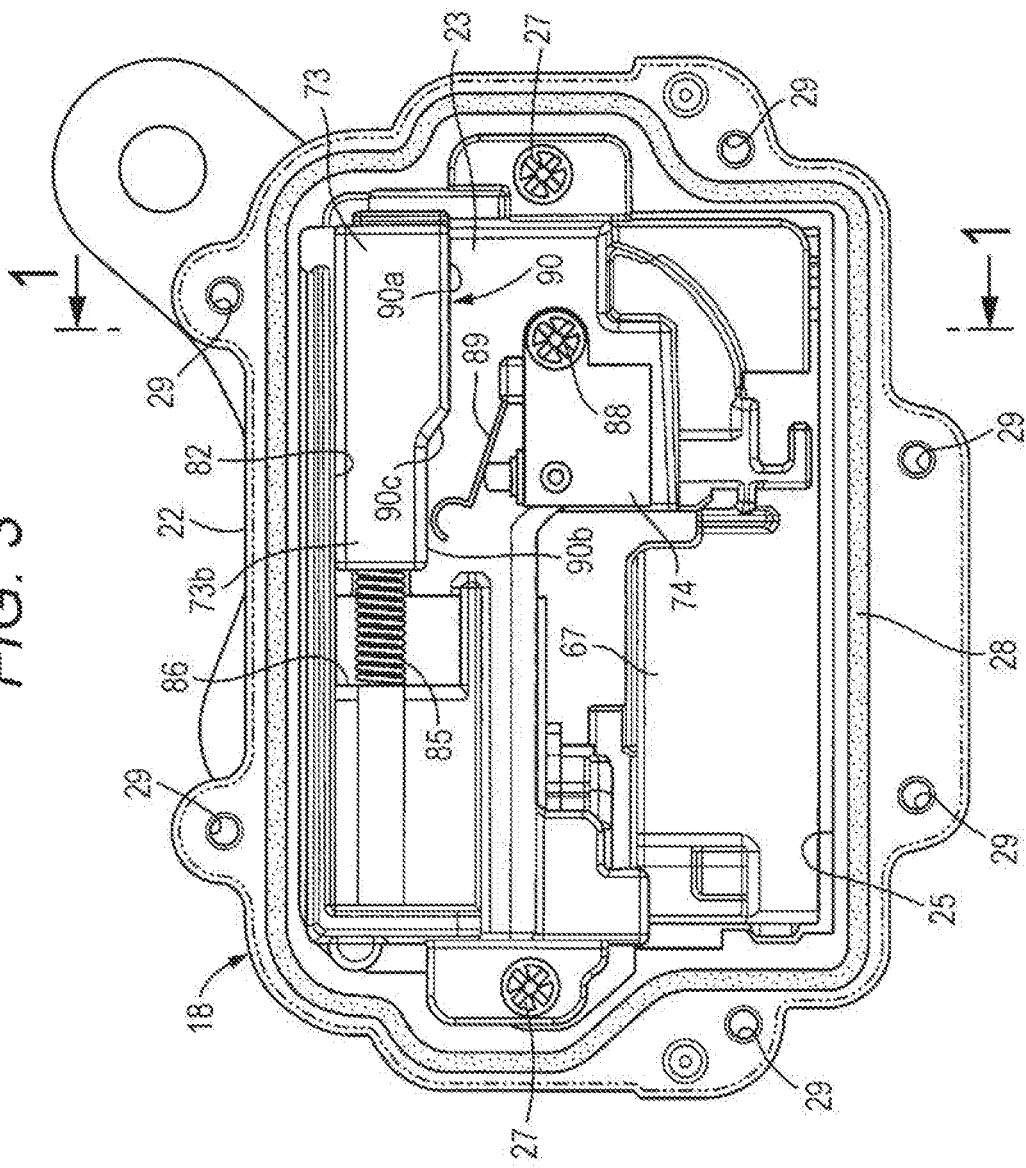
FIG. 3 is a side view viewed in an arrow 3 direction in FIG. 1.

Also with reference to FIG. 3, the casing 18 includes a body 22, an inner cover 23, and an outer cover 24. The body 22 has first and second housing recesses 25 and 26 opened to a side opposite to the top bridge 16. The inner cover 23 is a cover member mounted to the body 22 so as to cover a part of an opening end of the first housing recess 25 and a part of an opening end of the second housing recess 26. The outer cover 24 is mounted to the body 22 such that the outer cover 24 covers the body 22 from the side opposite to the top bridge 16 while this inner cover 23 is located between the outer cover 24 and this body 22. The inner cover 23 is fastened to the body 22 with a pair of first screw members 27. The outer cover 24 is fastened to the body 22 with six pieces of second screw members 30 while a sealing member 28 continuous in an endless shape is interposed between the body 22 and the outer cover 24. The body 22 has drilled six pieces of screw holes 29 to screw the second screw members 30. The body 22 and the inner cover 23 are formed of a paramagnetic material, such as a zinc alloy or a magnesium alloy. The outer cover 24 is formed of synthetic resin.

The lock pin 19 has one end portion configured to fit to the locking recess 17 of the top bridge 16. The lock pin 19 is slidably fitted to a guide hole 31 provided on the body 22. One end of this guide hole 31 is opened to the center portion of a distal end of a protrusion portion 22a. The protrusion portion 22a is disposed on the body 22 so as to be fitted to a fitted hole 32 provided on the vehicle body frame 15. The other end of the guide hole 31 is opened to the first housing recess 25.

The electric motor 21 has an axis line orthogonal to an axis line of the lock pin 19. On a projection diagram to a plane orthogonal to the axis line of this electric motor 21, the electric motor 21 is arranged at a position at which the lock pin 19 is interposed between the top bridge 16 and the electric motor 21. A part of a motor housing 33 of this electric motor 21 is housed in the second housing recess 26 provided more shallowly than the first housing recess 25. This motor housing 33 is securely supported to the body 22.

The electric motor 21 includes a motor shaft 34 projecting from the motor housing 33 to the first housing recess 25 side. A motion converter 35 is interposed between this motor shaft 34 and the lock pin 19. The motion converter 35 converts a rotational motion of the electric motor 21 into a linear motion of the lock pin 19.

The motion converter 35 includes a worm gear 36, a worm wheel 37, a screw shaft 38, the slider 20, a coupling member 39, and a first coiled spring 40. The worm gear 36 is fixedly disposed on the motor shaft 34. The worm wheel 37 meshes with this worm gear 36. One end portion of the screw shaft 38 is secured to this worm wheel 37. The slider 20 is threadably mounted to the screw shaft 38 not allowing a rotation around a shaft line of this screw shaft 38. The coupling member 39 is coupled to the lock pin 19 not allowing a relative movement in the movement direction of this lock pin 19. The first coiled spring 40 is an elastic member interposed between the lock pin 19 and the slider 20.

The worm gear 36, the worm wheel 37, the screw shaft 38, the slider 20, the coupling member 39, and the first coiled spring 40 are arranged in the first housing recess 25 of the body 22. The one end portion of the screw shaft 38 is rotatably supported to a body side bearing housing 41 via a first bearing member 42. The body side bearing housing 41 is disposed on the body 22 in an inner end portion of the first housing recess 25. The other end portion of the screw shaft 38 is rotatably supported to a cover side bearing housing 43 via a second bearing member 44. The cover side bearing housing 43 is disposed at the inner cover 23, which covers a part of the opening end of the first housing recess 25.

Figure 4:
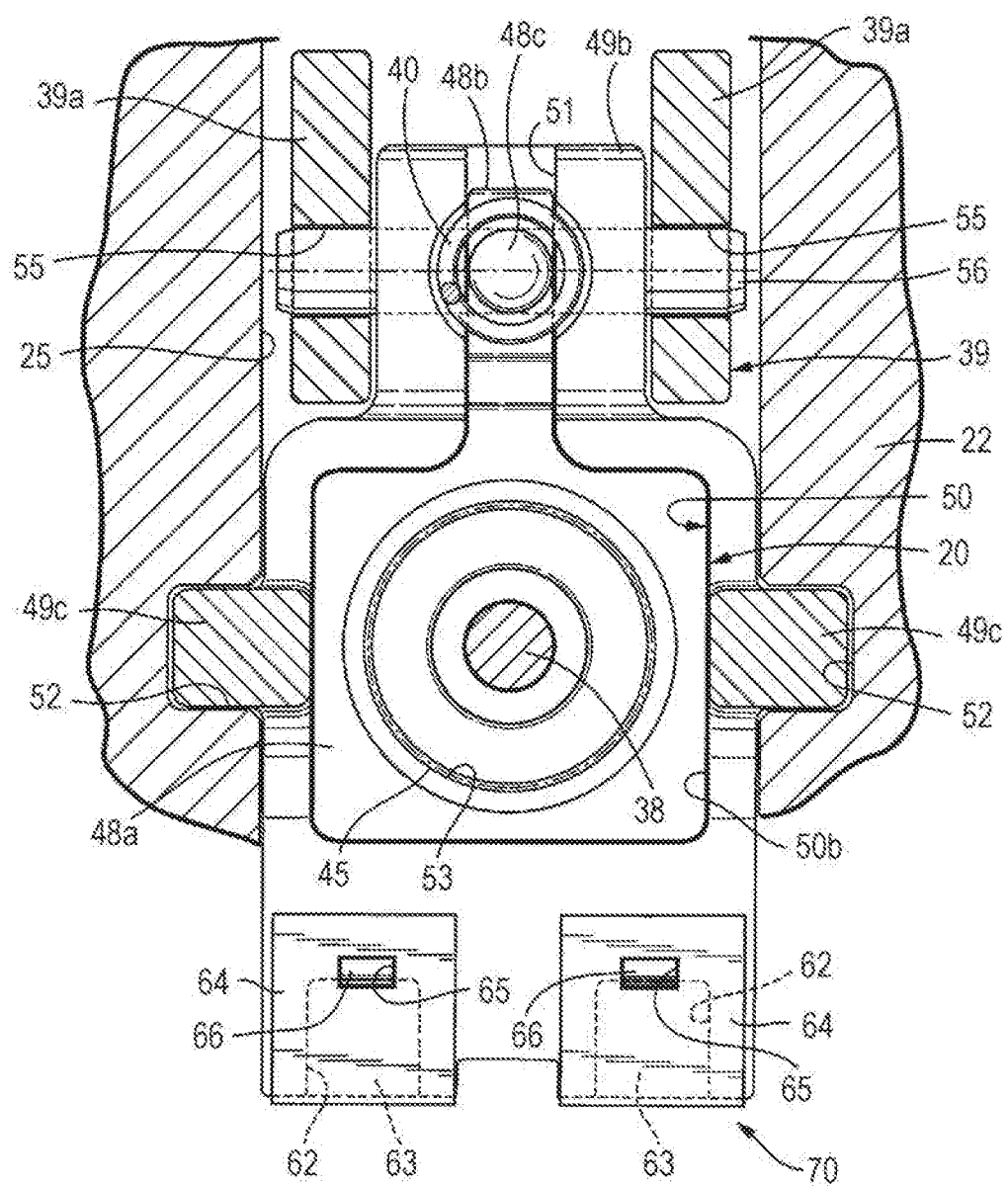
FIG. 4 is a cross-sectional view taken along a line 4-4 in FIG. 2.
Figure 5:
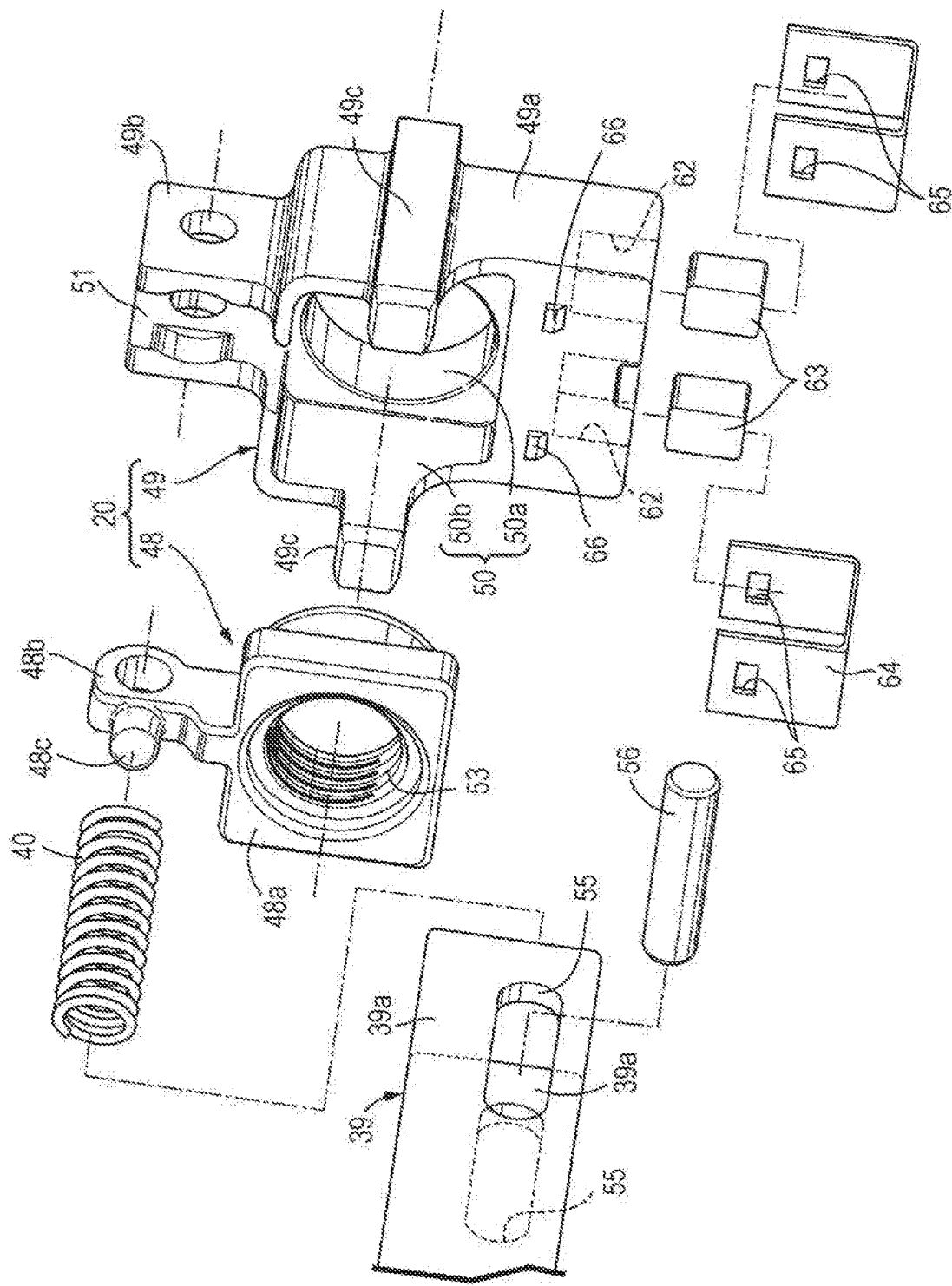
FIG. 5 is an exploded perspective view of a slider.

Also with reference to FIG. 4 and FIG. 5, the slider 20 includes a nut 48 and a magnet holding member 49. The nut 48 is formed of a ferromagnet having a rigidity, such as an iron material and is threadably mounted to a male screw 45 of the screw shaft 38. The magnet holding member 49 is formed of a paramagnetic material, such as a zinc alloy, and covers the nut 48. The nut 48 and the magnet holding member 49 are mutually combined not allowing a relative movement in a direction along the shaft line of the screw shaft 38 and a relative rotation around the shaft line of the screw shaft 38.

The magnet holding member 49 integrally includes a holding member main portion 49a, an arm portion 49b, and a pair of guide protrusion portions 49c. The holding member main portion 49a has a press-fitted hole 50 formed by continuously forming a circular hole portion 50a and a non-circular hole portion 50b having an approximately rectangular shape. The arm portion 49b extends from this holding member main portion 49a to the lock pin 19 side. The pair of guide protrusion portions 49c is continuously disposed on both side portions of the holding member main portion 49a and extends parallel to the screw shaft 38. The arm portion 49b includes a groove 51 provided over its entire length. The groove 51 is opened to the top bridge 16 side and has an inner end communicated with the press-fitted hole 50.

On both side surfaces of the first housing recess 25 in the body 22, a pair of guide grooves 52 is provided so as to extend parallel to the screw shaft 38. The guide protrusion portions 49c of the magnet holding member 49 slidably fits to the pair of guide grooves 52. This enables the magnet holding member 49 and the nut 48 to move in a shaft line direction of the screw shaft 38 while the magnet holding member 49 and the nut 48 cannot rotate around the shaft line of the screw shaft 38 by being guided by both the guide grooves 52.

The nut 48 integrally includes a nut main portion 48a, a coupling arm portion 48b, and a spring receiving protrusion portion 48c. The nut main portion 48a is press-fitted to the press-fitted hole 50 on the holding member main portion 49a of the magnet holding member 49. The coupling arm portion 48b is disposed to extend from the nut main portion 48a so as to be inserted into the groove 51 of the arm portion 49b on the magnet holding member 49. The spring receiving protrusion portion 48c is disposed to protrude toward the top bridge 16 side from a distal end portion of this coupling arm portion 48b. In the nut main portion 48a, a screw hole 53 to which the male screw 45 of the screw shaft 38 is threadably mounted is provided.

The coupling member 39 is formed to integrally include a pair of coupling wall portions 39a and a bridge 39b. The pair of coupling wall portions 39a sandwiches the arm portion 49b of the magnet holding member 49 and the coupling arm portion 48b of the nut 48 from both sides. The bridge 39b is disposed between end portions of those coupling wall portions 39a on the top bridge 16 side. On the other hand, on the other end portion of the lock pin 19, a ring groove 54 is formed. Thus, engaging the bridge 39b of the coupling member 39 with the ring groove 54 couples the coupling member 39 to the lock pin 19 not allowing the relative movement in the movement direction of this lock pin 19. Consequently, the coupling member 39 linearly moves together with the lock pin 19.

On the pair of coupling wall portions 39a, oblong holes 55 extending long in a longitudinal direction of the guide hole 31 are each provided. Further, a pin 56 is press-fitted to pass through the arm portion 49b of the magnet holding member 49 and the coupling arm portion 48b of the nut 48. Both end portions of the pin 56 are inserted into the oblong holes 55.

On the other end portion of the lock pin 19, a spring housing recess 57 opened to the nut 48 side is coaxially provided. One end portion of the first coiled spring 40 abuts on an inner end portion of this spring housing recess 57. The other end portion of the first coiled spring 40 abuts on a distal end portion of the arm portion 49b of the magnet holding member 49 such that the spring receiving protrusion portion 48c of the nut 48 fits into the other end portion of the first coiled spring 40. The spring force provided by this first coiled spring 40 biases the lock pin 19 toward the top bridge 16 side, that is, the lock position side in a range where the pin 56 can move in the oblong holes 55.

Then, the screw shaft 38 rotates in one direction corresponding to a rotation in the one direction of the electric motor 21. Thus, as illustrated in FIG. 1 and FIG. 2, when the slider 20 moves to the top bridge 16 side, the lock pin 19 is pressed to the lock position side from the slider 20 via the first coiled spring 40. In view of this, when the locking recess 17 of the top bridge 16 is located at a position at which the locking recess 17 matches the lock pin 19, the lock pin 19 fits to the locking recess 17. Additionally, when the one end portion of the lock pin 19 abuts on an outer surface of the top bridge 16 at the position out of the locking recess 17, the slider 20 moves to the top bridge 16 side while the slider 20 compresses the first coiled spring 40. This turns the top bridge 16 to a position at which the lock pin 19 fits to the locking recess 17. Consequently, the spring force of the first coiled spring 40 moves the lock pin 19 to the lock position at which the lock pin 19 fits to the locking recess 17.

Figure 6:
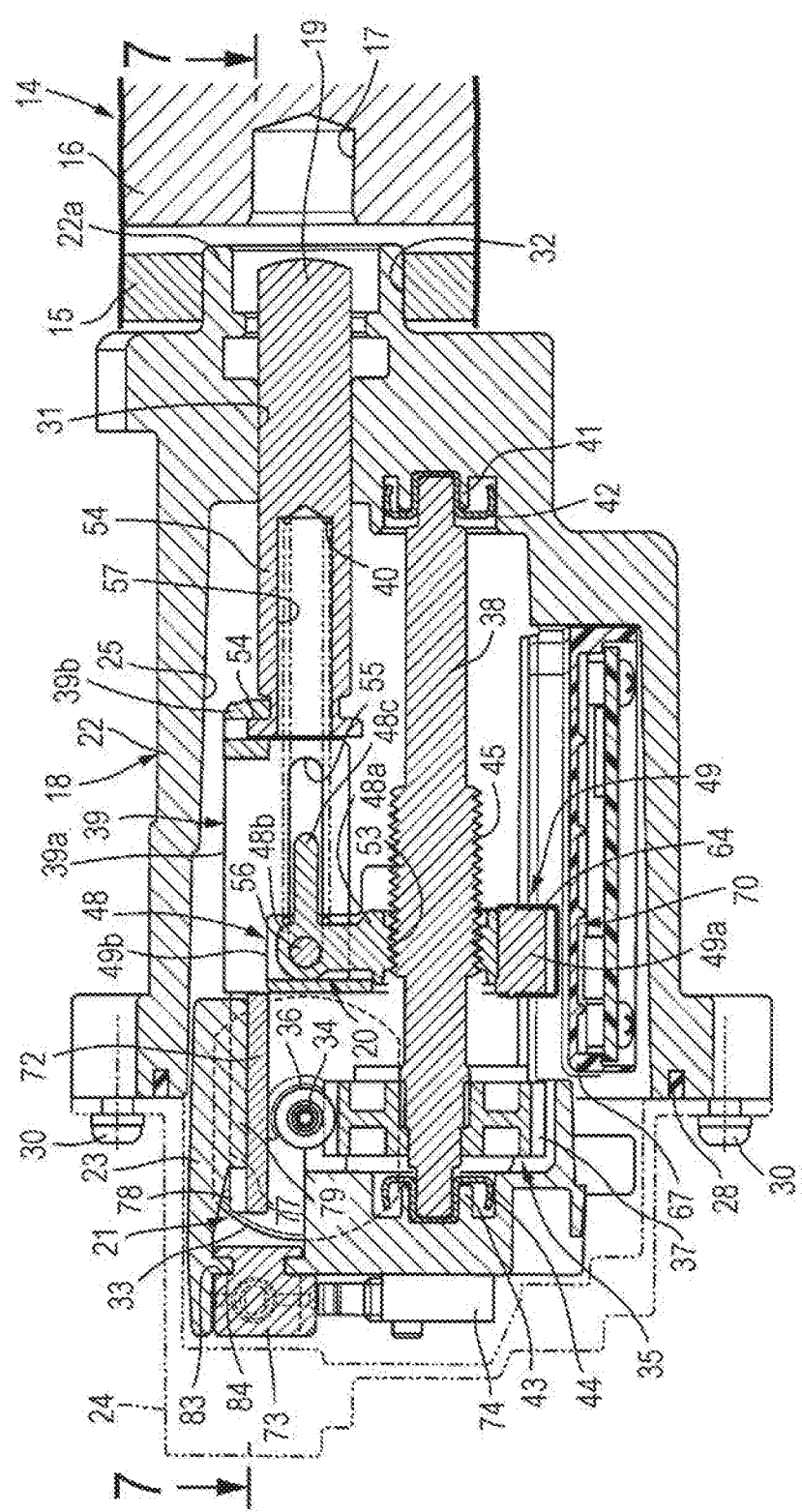
FIG. 6 is a cross-sectional view corresponding to FIG. 1 in a state where the lock pin is located at an unlock position.
Figure 7:
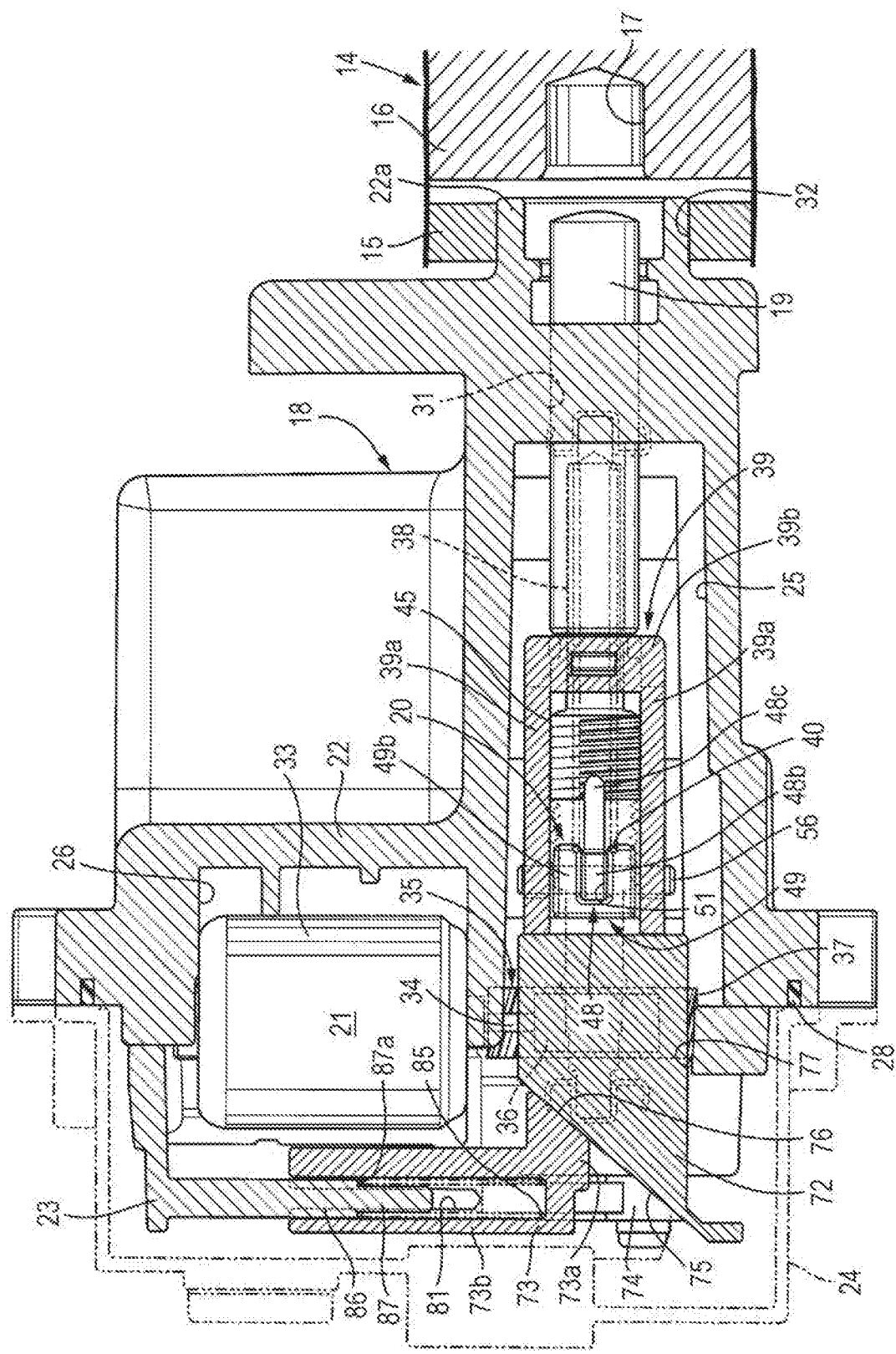
FIG. 7 is a cross-sectional view taken along a line 7-7 in FIG. 6.

Further, the screw shaft 38 rotates in another direction corresponding to a rotation in the other direction of the electric motor 21. This moves the slider 20 to a side on which the slider 20 is separated from the top bridge 16, as illustrated in FIG. 6 and FIG. 7. At this time, the pin 56 abuts on end portions on a side opposite to the top bridge 16 on the oblong holes 55, which are provided on the coupling wall portions 39a of the coupling member 39 coupled to the lock pin 19. This moves the lock pin 19 to the unlock position together with the slider 20.

The operation of the electric motor 21 is controlled by a control unit 60. While a base plate 61 of this control unit 60 is opposed to the holding member main portion 49a of the magnet holding member 49, the base plate 61 is housed in the first housing recess 25 and is fastened to the body 22.

On the side portion of the holding member main portion 49a on the base plate 61 side, a pair of magnet housing recesses 62 is provided such that their positions along a movement direction of the slider 20 are identical. Then, the pair of magnet housing recesses 62 houses magnets 63. Holders 64 for housing and holding the magnets 63 in the magnet housing recesses 62 are mounted to the holding member main portion 49a.

The holder 64 is formed of a paramagnetic material, such as a copper alloy, and is formed in an approximately U-shape. The holder 64 is fitted on the side portion of the holding member main portion 49a on the base plate 61 side so as to cover the magnet housing recesses 62. Engagement protrusion portions 66 disposed to protrude on the holding member main portion 49a engage with engagement holes 65 provided on both end portions of the holders 64. Thus, the holder 64 is mounted to this magnet holding member 49 such that the magnet 63 is held by the magnet holding member 49.

A case 67 that is made of synthetic resin and is formed in a box shape opened to a side opposite to the slider 20 is inserted to the first housing recess 25 of the body 22. The synthetic resin case 67 is opposed to the slider 20 from a side opposite to the lock pin 19. This case 67 is secured to the body 22 so as to cover the base plate 61 from the slider 20 side.

A position of the slider 20 is detected by a position detector 70. This position detector 70 includes the pair of magnets 63 and a plurality of hall sensors (not illustrated). The plurality of hall sensors is arranged at fixed positions of the base plate 61 so as to enable detecting the position of the slider 20 by a magnetic field of the pair of magnets 63.

When the position detector 70 detects: a state where the slider 20 is located at a position at which the lock pin 19 is moved to the lock position; and a state where the slider 20 is located at a position at which the lock pin 19 is moved to the unlock position, the control unit 60 stops an energization to the electric motor 21 and notifies a vehicle side control circuit of this state. Further, when the position detector 70 detects that the lock pin 19 is located at a position immediately ahead of the unlock position, the control unit 60 notifies the vehicle side control circuit of this state in advance to perform an action of the vehicle side after a steering lock state is released.

Figure 8:
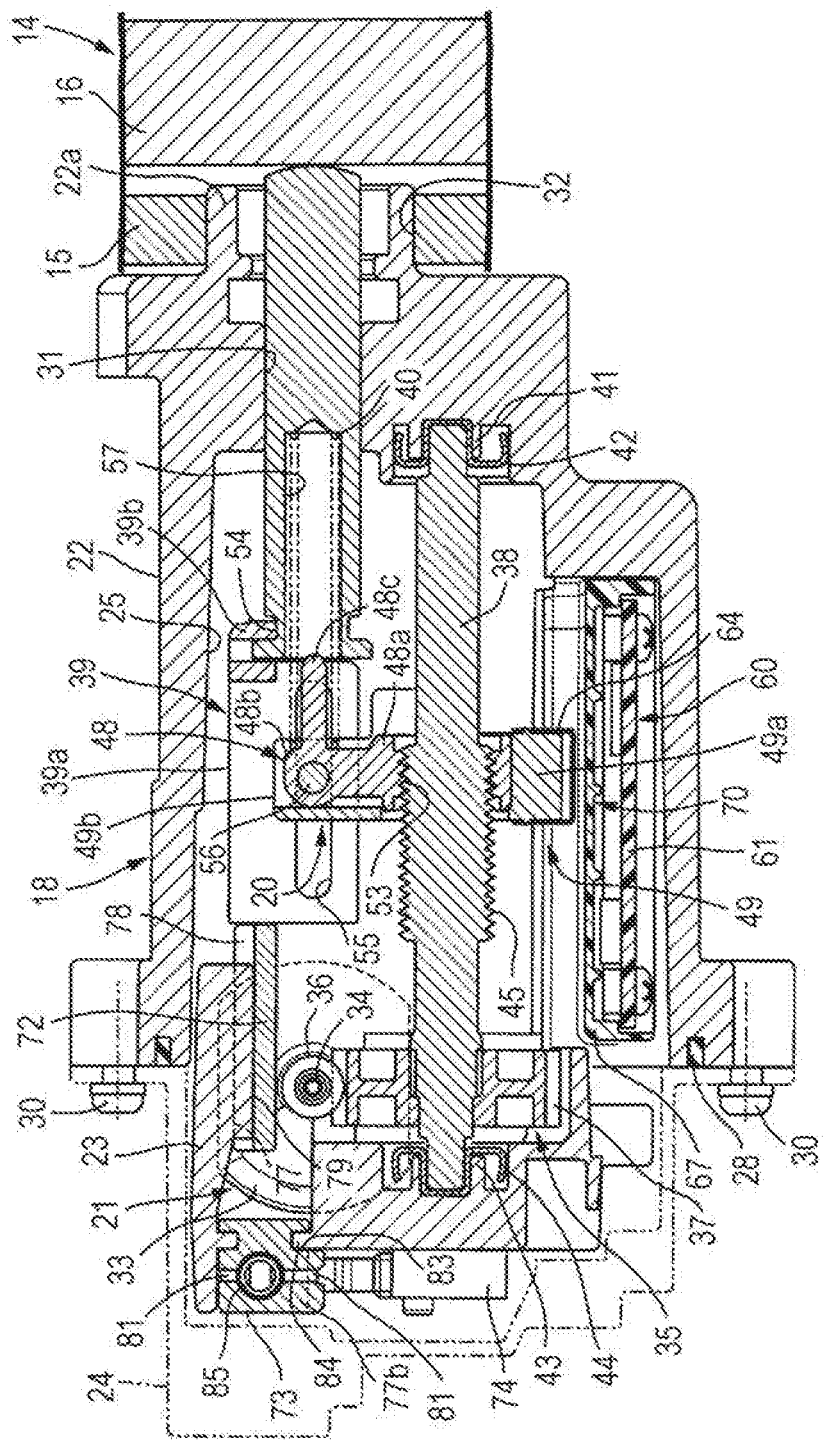
FIG. 8 is a cross-sectional view corresponding to FIG. 1 in a state where the lock pin abuts on an outer surface of a steering shaft.

In a motorcycle, only at a position where the lock pin 19 fits to one of the locking recesses 17 provided at the two positions of the top bridge 16, the lock pin 19 can move to the lock position. Thus, as illustrated in FIG. 8, in a state where the locking recess 17 is located at the position displaced from the lock pin 19, even when the slider 20 moves so as to move the lock pin 19 to the lock position, the lock pin 19 merely remains at a position abutting on the outer surface of the top bridge 16 and does not move to the lock position. Then, when steering the steering handle turns the top bridge 16 to cause the locking recess 17 to match the lock pin 19, the lock pin 19 fits to the locking recess 17 and moves to the lock position due to the spring force of the first coiled spring 40. In view of this, even when the position detector 70 detects that the slider 20 is located at a position to configure the lock pin 19 as the lock position, there is a possibility that the lock pin 19 does not reach the lock position.

Here, according to the present invention, a first interlocking member 72 that moves in the direction identical to the movement direction of this lock pin 19 by interlocking with the lock pin 19, and a second interlocking member 73 that moves in a direction orthogonal to the movement direction of the lock pin 19 and the first interlocking member 72 by interlocking with this first interlocking member 72 are movably supported to the inner cover 23 of the casing 18. Furthermore, a switch 74 that detects a position of the second interlocking member 73 is mounted to the inner cover 23.

Figure 9:
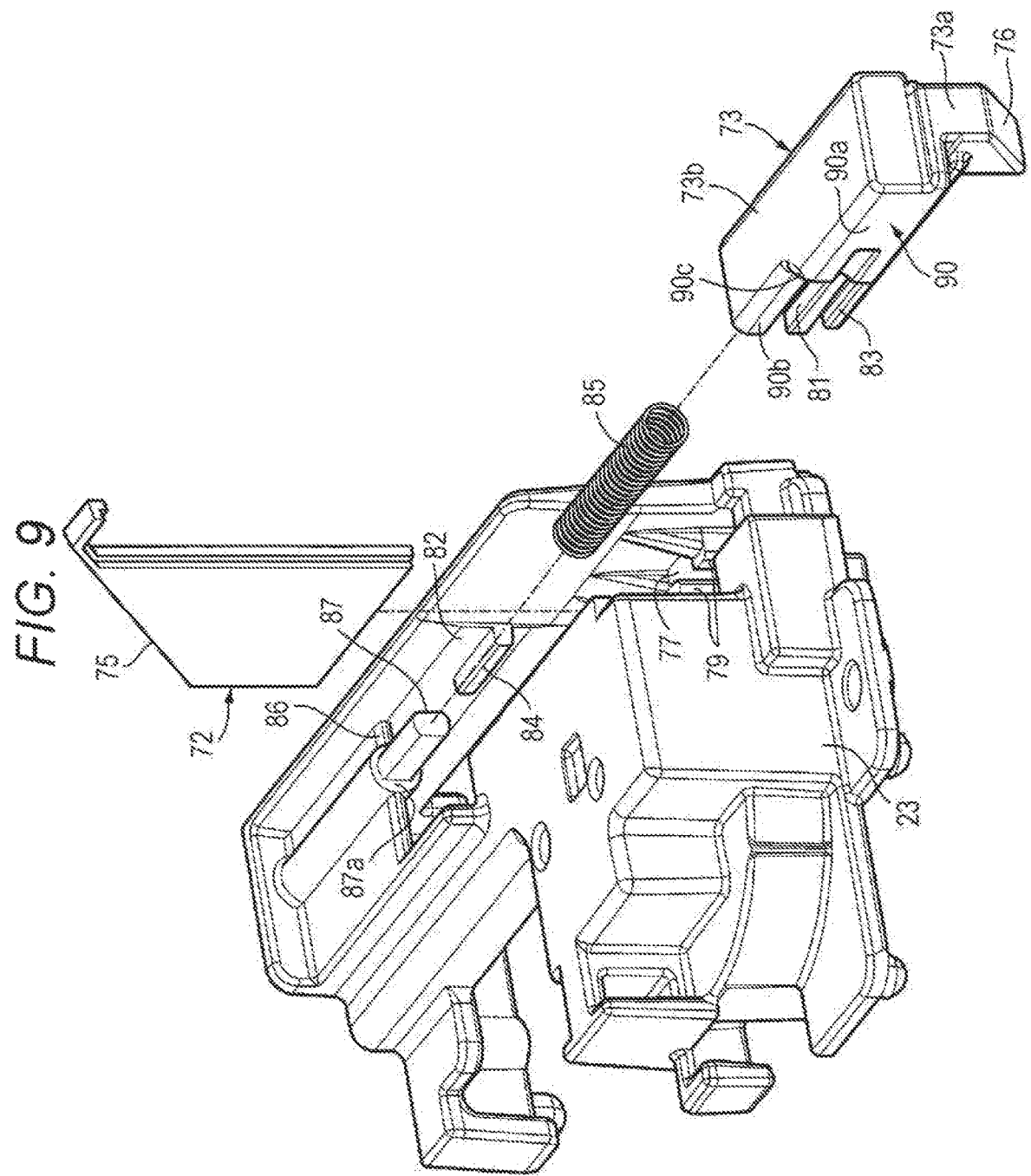
FIG. 9 is an exploded perspective view of an inner cover and first and second interlocking members.

Also with reference to FIG. 9, the first interlocking member 72 is formed typically in a flat plate shape. While a part of the first interlocking member 72 is housed in the first housing recess 25 so as to overlap a part of the motor housing 33 viewed from a direction along the motor shaft 34 of the electric motor 21, the first interlocking member 72 is supported to the inner cover 23 so as to be movable in a direction identical to the movement direction of the lock pin 19 and the coupling member 39. One end portion of the first interlocking member 72 abuts on the pair of coupling wall portions 39*a* included in the coupling member 39, which moves with the lock pin 19.

On the other end side of this first interlocking member 72, a pressure receiving surface 75 that is inclined so as to be separated from the lock pin 19 as separated from the electric motor 21 is formed.

On the other hand, the second interlocking member 73 is arranged on the side opposite to the lock pin 19 with respect to the electric motor 21 and the worm gear 36, which is fixedly disposed on the motor shaft 34 of this electric motor 21. The second interlocking member 73 is supported to the inner cover 23 so as to enable a movement in a direction orthogonal to the movement direction of the first interlocking member 72, in this embodiment, a direction parallel to a shaft line of the motor shaft 34.

On the inner cover 23, a first supporting hole 77 that movably supports the first interlocking member 72 is formed. A pair of first guide projections 79 is disposed to protrude on an inner surface of this first supporting hole 77. The pair of first guide projections 79 guides a pair of protrusions 78 disposed to protrude on one surface of this first interlocking member 72 so as to extend long along the movement direction of the first interlocking member 72.

The second interlocking member 73 integrally includes a pressing protrusion portion 73*a* on its one end portion. The pressing protrusion portion 73*a* has a pressing surface 76 inclined so as to abut on the pressure receiving surface 75 of the first interlocking member 72 and projects to the lock pin 19 side. The other end side of the second interlocking member 73 is formed to integrally include a spring housing tube portion 73*b* extending along a movement direction of this second interlocking member 73. The spring housing tube portion 73*b* is formed so as to have an outer surface shape having a rectangular lateral cross-sectional surface such that a spring housing recess 80 having a circular-shaped lateral cross-sectional surface is internally formed. The spring housing tube portion 73*b* includes a pair of slits 81 arranged on in-one diameter line of the spring housing recess 80.

On the inner cover 23, a second supporting hole 82 is provided so as to be opened to a side opposite to the body 22 of the inner cover 23 and be opened to a side portion of the inner cover 23 on a side opposite to the electric motor 21. The second supporting hole 82 extends parallel to the axis line of the electric motor 21 across the first supporting hole 77 while extending over the first and second housing recesses 25 and 26. This second supporting hole 82 movably supports the second interlocking member 73. Further, recesses 83 are formed on both sides of the spring housing tube portion 73*b* of the second interlocking member 73 and extend in a longitudinal direction of this spring housing tube portion 73*b*. Second guide projections 84 slidably fitted to the recesses 83 are disposed to protrude on mutually opposed two inner surfaces of the second supporting hole 82.

Between the second interlocking member 73 and the inner cover 23, a second coiled spring 85 is contracted. The second coiled spring 85 causes the pressing surface 76 of the second interlocking member 73 to always abut on the pressure receiving surface 75 of the first interlocking member 72. This causes the first interlocking member 72 to always abut on the coupling member 39 to linearly move the first interlocking member 72 by interlocking with the coupling member 39 and the lock pin 19. Consequently, the second interlocking member 73 moves in a direction orthogonal to the movement direction of the first interlocking member 72 by interlocking with the first interlocking member 72.

One end portion of the second coiled spring 85 is inserted into the spring housing tube portion 73b to abut on the second interlocking member 73. On the other hand, as illustrated in FIG. 3, on the inner cover 23, a flat plate 86 is formed to have a plate thickness that can be fitted to the slits 81. The flat plate 86 is arranged on an inner end portion of the second supporting hole 82 to be opposed to the spring housing tube portion 73b of the second interlocking member 73 when the lock pin 19 is located at the lock position. A spring receiving protrusion portion 87 that is inserted into the other end portion of the second coiled spring 85 is disposed to protrude at the center portion of this flat plate 86. On a base end portion of this spring receiving protrusion portion 87, a spring receiving portion 87a having a stepped shape is formed. The spring receiving portion 87a having a stepped shape abuts on the other end portion of the second coiled spring 85.

Figure 10:
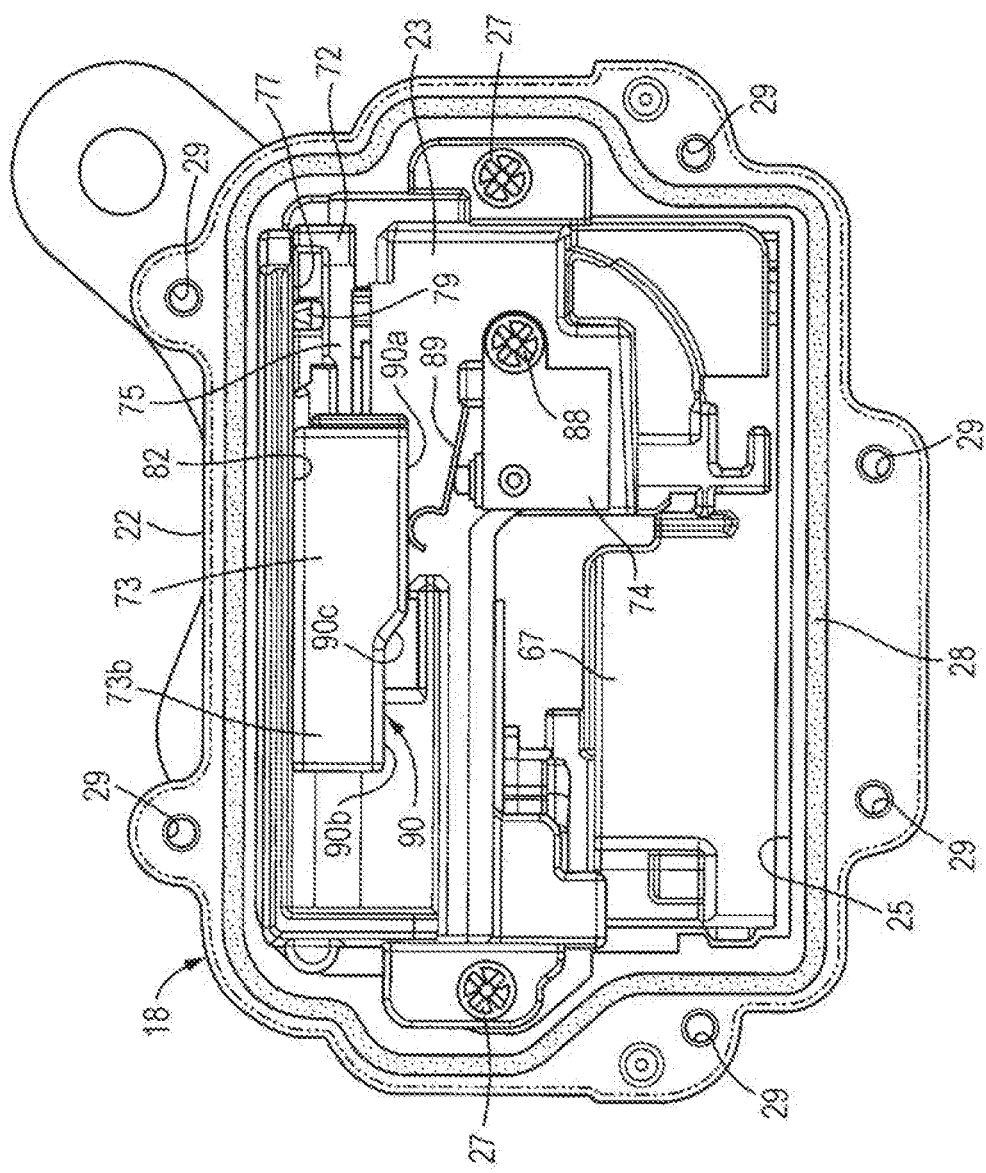
FIG. 10 is a side view corresponding to FIG. 3 in a state where the lock pin is located at the unlock position.

When the lock pin 19 is located at the lock position, as illustrated in FIG. 3, the second interlocking member 73 that interlocks with the first interlocking member 72 is located at a position at which the second interlocking member 73 is the most separated from the flat plate 86 of the inner cover 23. In contrast, when the lock pin 19 is located at the unlock position, as illustrated in FIG. 10, the flat plate 86 of the inner cover 23 enters an inside of the slits 81 of the spring housing tube portion 73b of the second interlocking member 73.

Figure 11:
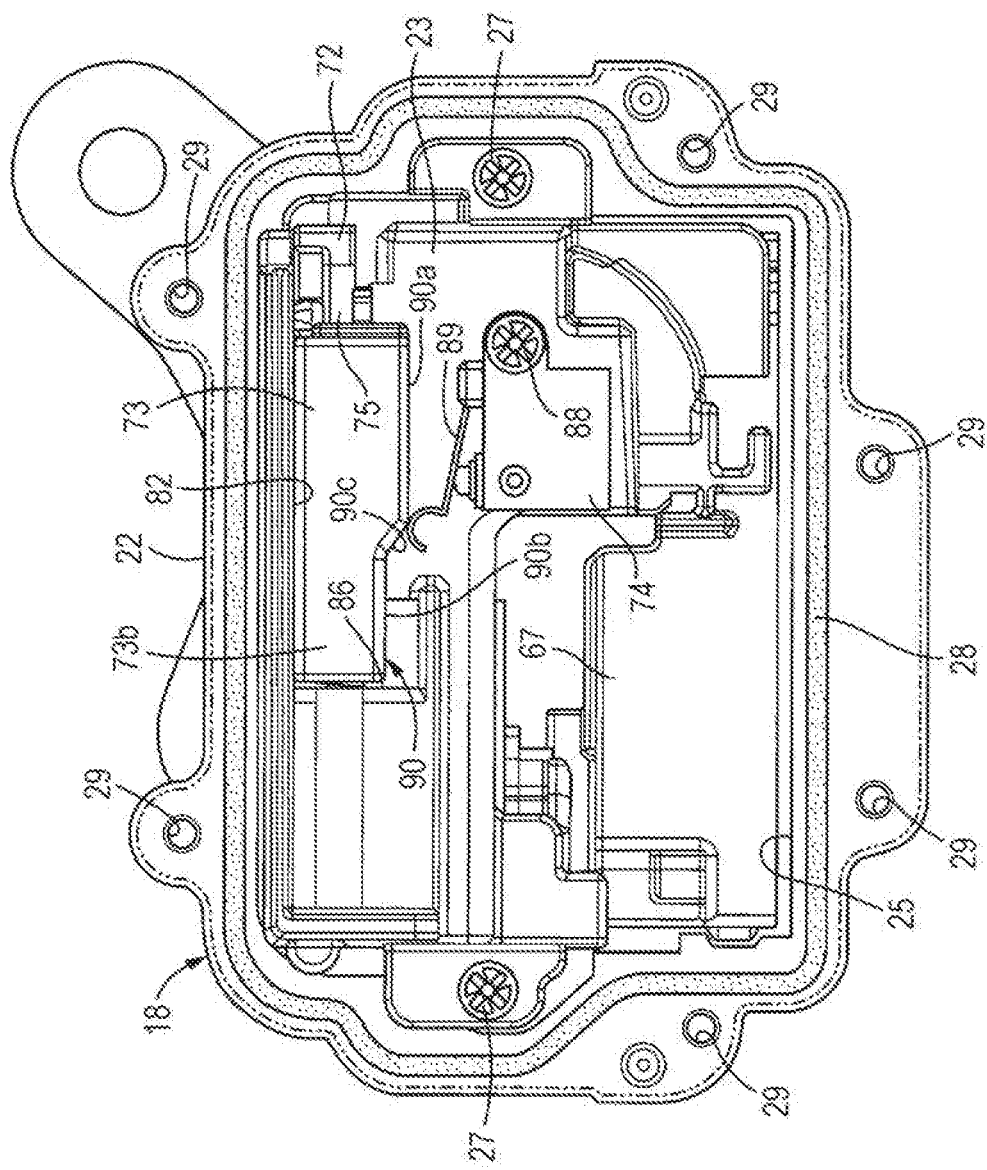
FIG. 11 is a side view corresponding to FIG. 3 in a state where the lock pin abuts on the outer surface of the steering shaft.

However, as illustrated in FIG. 8, since the locking recess 17 is located at the position displaced from the lock pin 19, even when the slider 20 moves so as to move the lock pin 19 to the lock position, the lock pin 19 sometimes merely remains at the position abutting on the outer surface of the top bridge 16 and does not move to the lock position. In this case, as illustrated in FIG. 11, the spring housing tube portion 73b of the second interlocking member 73 that interlocks with the lock pin 19 via the first interlocking member 72 remains at the position opposed to the flat plate 86 of the inner cover 23.

In order to detect such a position of the second interlocking member 73, the switch 74 is fastened to an outer surface of the inner cover 23 with a screw member 88 so as to be arranged on a side portion of the second interlocking member 73.

The switch 74 includes a probe 89 arranged on the second interlocking member 73 side. On a side surface of the second interlocking member 73 on the switch 74 side, a detected surface 90 detected with the probe 89 is formed. This detected surface 90 includes a high portion 90a, a low portion 90b, and an inclined step portion 90c. When the lock pin 19 is located at the unlock position, as illustrated in FIG. 10, the high portion 90a projects to the switch 74 side with respect to other portions on the detected surface 90 such that the probe 89 is pushed. When the lock pin 19 is located at the lock position, as illustrated in FIG. 3, the low portion 90b moves away from the switch 74 with respect to the high portion 90a such that a force pushing the probe 89 is released. The inclined step portion 90c connects the high portion 90a to the low portion 90b. Thus, when the lock pin 19 merely remains at the position at which the lock pin 19 abuts on the outer surface of the top bridge 16 and does not move to the lock position even when the slider 20 moves so as to move the lock pin 19 to the lock position, the probe 89 abuts on an end portion of the inclined step portion 90c on the high portion 90a side.

In such electric steering lock device, operating a portable device by a user in the steering lock state performs an ID check through a wireless exchange between the portable device and the control unit 60. In response to this, the electric motor 21 operates, and the slider 20 moves so as to drive the lock pin 19 to the unlock position. At this time, when the position detector 70 detects that the slider 20 has not moved until the lock pin 19 is moved to the unlock position, an indicator (not illustrated) notifies it. Further, operating the portable device by the user in the state where the lock pin 19 is located at the unlock position performs an ID check through a wireless exchange between the portable device and the control unit 60. In response to this, the electric motor 21 operates, and the slider 20 moves so as to drive the lock pin 19 to the lock position. At this time, when the switch 74 detects that the lock pin 19 merely remains at the position at which the lock pin 19 abuts on the outer surface of the top bridge 16 and does not move to the lock position even while the position detector 70 detects that the slider 20 has moved until the lock pin 19 is moved to the lock position, the indicator notifies it.

Next, the effects of this embodiment will be described. The casing 18 movably supports: the first interlocking member 72, which moves in the direction identical to the movement direction of this lock pin 19 by interlocking with the lock pin 19: and the second interlocking member 73, which moves in the direction orthogonal to the movement direction of the lock pin 19 and the first interlocking member 72 by interlocking with this first interlocking member 72, and the switch 74, which detects a position of the second interlocking member 73, is mounted to the casing 18. This enables the position of the lock pin 19 to be reliably detected at a position away from the lock pin 19 and eliminates the need for ensuring an extra space at a proximity of the lock pin 19 to avoid increase in the size of the electric steering lock device.

Further, the casing 18 movably supports the lock pin 19 and the slider 20. Furthermore, the casing 18 at least includes the body 22 and the inner cover 23. The body 22 houses the first coiled spring 40, which is interposed between the lock pin 19 and the slider 20, and the electric motor 21 and is mounted to the vehicle body frame 15. The inner cover 23 is mounted to this body 22 and covers a part of the body 22 while the inner cover 23 supports the first and second interlocking members 72 and 73. This enables the first and second interlocking members 72 and 73 to be installed to the inner cover 23 before mounted to the body 22. In view of this, the inner cover 23 to which the first and second interlocking members 72 and 73 are installed is mounted to the body 22 to ensure the facilitated installation operation.

While the embodiment of the present invention has been described above, the present invention is not limited to the above-described embodiment and various design changes can be made without departing from the present invention described in the claims.

For example, the present invention is widely applicable to not only a motorcycle, but also a saddle-ride type vehicle including a three-wheeled motorcycle.

LIST OF THE REFERENCE NUMERALS

15: Vehicle body frame
16: Top bridge as steering interlocking member
18: Casing
19: Lock pin
20: Slider 21: Electric motor
22: Body
23: Inner cover as cover member
40: First coiled spring as elastic member
72: First interlocking member
73: Second interlocking member
74: Switch

The invention claimed is:

1. An electric steering lock device for saddle-ride type vehicle, comprising:
    a casing (18) secured to a vehicle body frame (15);
    a steering interlocking member (16) that turns in accordance with a steering operation;
    a lock pin (19) linearly movable between a lock position and an unlock position, the lock pin (19) engaging with the steering interlocking member (16) at the lock position, and the lock pin (19) releasing the engagement with the steering interlocking member (16) at the unlock position;
    a slider (20) movable in a direction identical to a movement direction of the lock pin (19);
    an elastic member (40) that movably supports the lock pin (19) and the slider (20) and is interposed between the lock pin (19) and the slider (20);
    an electric motor (21) that provides a power that drives the slider (20);
    a first interlocking member (72);
    a second interlocking member (73); and
    a switch (74), wherein
    the casing (18) houses the lock pin (19), the slider (20), the elastic member (40), and the electric motor (21),
    the first interlocking member (72) receives the power from the electric motor (20) via the slider (20) to move in the direction identical to the movement direction of the lock pin (19), thereby interlocking with the lock pin (19),
    the second interlocking member (73) moves in a direction orthogonal to the movement direction of the lock pin (19) and the first interlocking member (72) by interlocking with the first interlocking member (72),
    the first interlocking member (72) and the second interlocking member (73) are movably supported to the casing (18), and
    the switch (74) detects a position of the second interlocking member (73) and is mounted to the casing (18).

2. The electric steering lock device for saddle-ride type vehicle according to claim 1, wherein
    the casing (18) at least includes a body (22) and a cover member (23),
    the body (22) movably supports the lock pin (19) and the slider (20), houses the elastic member (40) and the electric motor (21), and is mounted to the vehicle body frame (15), and
    the cover member (23) is mounted to the body (22) and covers a part of the body (22), the cover member (23) supporting the first and second interlocking members (72 and 73).

3. The electric steering lock device for saddle-ride type vehicle according to claim 1, further comprising:
    a coupling member (39) that couples the lock pin (19) with the slider (20), the coupling member (39) being movable together with the lock pin (19) in the movement direction of the lock pin (19), and
    a second elastic member (85) that biases the second interlocking member (73) towards the first interlocking member (72), wherein
    in both cases where the lock pin (19) is located at the locked position and the lock pin (19) is located at the unlocked position, the second interlocking member (73) receives pressure from the second elastic member (85) and abuts the first interlocking member (72) to cause the first interlocking member (72) to cause the first interlocking member (72) to abut the coupling member (39).

4. The electric steering lock device for saddle-ride type vehicle according to claim 1, wherein
    the switch (74) includes a first state and a second state different from the first state,
    when the lock pin (19) is located at the unlocked position, the switch is in the first state,
    when the lock pin (19) is located at the locked position, the switch is in the second state, and
    when the lock pin (19) is located at a position at which the lock pin (19) abuts on an outer surface of the steering interlocking member (16), the switch is in the first state.

5. The electric steering lock device for saddle-ride type vehicle according to claim 1, wherein
    the first interlocking member (72) includes a pressure receiving surface (75) that is inclined with respect to both of the movement direction of the lock pin (19) and the direction orthogonal to the movement direction of the lock pin (19); and
    the second interlocking member (73) includes a pressing surface (76) that is parallel to the pressure receiving surface (75) and is slidable on the pressure receiving surface (75).

* * * * *